United States Patent Office 3,250,627
Patented May 10, 1966

3,250,627
PUFF PASTRY-CHEMICALLY LEAVENED
PASTE LAMINATES
Ray J. Thelen, 6501 5th Ave. S., Minneapolis, Minn.
No Drawing. Filed Aug. 26, 1963, Ser. No. 304,672
4 Claims. (Cl. 99—92)

This invention relates to new and very useful flour-based, partially chemically-leavened, non-yeast-leavened paste food products.

More particularly, my invention is directed to puff pastries and intermediates therefor wherein a layer of puff paste is laminated to a layer of chemically-leavened paste, the chemically-leavened paste containing substantially all of the flavoring mixed therein. My invention is also directed to processes for making such intermediate and cooked products.

Puff paste, as those skilled in the art will appreciate is made from flour, water, salt, and shortening material; it contains no leavening. The quality of puff pastry paste and the lightness and volume of the cooked product made therefrom depend upon the introduction of fat into the raw dough in such a way as to develop numerous layers of dough separated by layers of fat—say up to about 800 to 1400 fat and dough layers per sheet. Fat layers are introduced into the dough by the so-called "rolling-in" process which can be accomplished, for example, as follows: After mixing, the dough is portioned for easy handling into 12 to 20 pound units. These units are sheeted three times as long as wide and are approximately 5/8 inch thick. Fat in the form of shortening, usually a special pastry butter, is spotted or spread over two-thirds of the top face of sheeted dough, i.e., so that there is approximately 80% as much shortening as dough. The unspotted approximate one-third dough is folded over the center third and the remaining one-third over the first two so-formed layers. Then the folded piece is turned 90° on the work area bench or automatic sheeting unit and again rolled three times as long as wide until the thickness is approximately 5/8 inch thick, then folded as for the spotting in roll. This process is repeated four to five times with a rest period of 30 to 60 minutes between rollings.

To speed up the layering operation and produce puff paste sheets in which the layering is not as uniform, one can employ the so-called "blitz" system in which layering is accomplished, for example, simply by adding the fat or "roll-in" material in small to medium size (from the size of whole walnuts to small apples) chunks to thoroughly mixed dough and thereafter continuing mixing only long enough to thoroughly incorporate the fat with the dough. Puff paste is generally kept in a cold place to keep it in condition for processing. It may be held over a period as long as six to eight days, processing into individual units as required.

The function of the fat is to separate the layers of dough so that when the sheeted puff paste is processed into individual pastries and put in an oven, the steam generated forces the very thin, delicate layers of dough apart thereby producing a characteristically light and flaky product, provided the fat has been rolled in evenly and is well distributed in the paste.

Puff paste doughs by themselves when cooked are bland and relatively tasteless, and it is difficult to add large amounts of filling or flavoring material without the puff paste becoming soggy and tough. Consequently, much puff pastry produced commercially is filled or flavored after baking.

I have now discovered how to produce puff pastry products which are highly flavored and which have characteristic continuously cellulated, self-supporting structures and in which the flavoring is associated with the paste prior to cooking.

It is, therefore, an object of this invention to provide methods for making flavored puff pastry products which are adapted to be highly flavored and which have continuously cellulated, self-supporting structures.

Another object is to provide intermediate or uncooked flour-based foods wherein a sheet or layer of puff pastry dough is laminated to a chemically-leavened or air-leavened layer of flavored paste.

Another object is to provide flour-based, flavored chemically-leavened or air-leavened foods having continuously cellulated, self-supporting structures in which a cooked puff pastry paste layer is directly and continuously associated on at least one surface with a chemically-leavened, flavored paste layer.

Additional objects of this invention will become apparent to those skilled in the art from the following detailed description.

As indicated generally above, in practicing my invention, one can employ puff pastry dough processed by any acceptable method. In general, puff pastry doughs characteristically have about equal parts of fat and flour making the total flour content fall in the range from about 40 to 60 weight percent of the total paste dough mass, especially as used in this invention.

One can employ as the chemically-leavened paste any non-yeast-leavened cake batter, cookie dough, or the like. As is the case of yeast-leavened dough, chemically-leavened doughs can be prepared in any one of a variety of ways, as demonstrated by the instructions of any reference book on cooking. Generally speaking, such pastes contain flour, shortening (which is bland and does not contribute by itself to produce flavoring), structure building materials (commonly derived from or consisting of eggs), flavoring, and water. Owing primarily to the variety of possible formations, it is not meaningful to give one generalized formulation for all chemically-leavened dough types used in making products within the teachings of this invention.

However, it will be understood that the term "chemically-leavened" or equivalent as used herein refers to a combination of sodium bicarbonate with acidifiers such as tartrates, phosphates, oxalates and the like and which react on the soda giving off carbon dioxide gas during baking.

Similarly, the term "flavoring" or equivalent as used herein has reference to any one or more of the materials which are in solid, semi-solid or liquid form of natural or synthetic origin and which are used to impart flavor to cooked foods and includes such various items as salt, sugar, nuts, fruits, cheese, plant extracts, and the like, as those skilled in the art will appreciate.

Thus, the term "chemically-leavened paste" as used herein has reference to a chemically-leavened mixture of flour, water, flavoring and other ingredients which mixture has a viscosity ranging from a thin, pourable consistency to a thick, putty-like consistency and which when baked or otherwise cooked expands into a cellular or cellulated, self-supporting structure. Chemically-leavened pastes characteristically have total flour contents ranging from about 10 to 25 weight percent, especially as used in this invention.

Largely because of the fact that chemically-leavened pastes have characteristically lower total flour contents than the total flour contents of puff paste dough, plus the fact that chemically-leavened pastes usually always contain eggs which are considered excellent structure building materials, one can incorporate generally higher quantities of flavoring in chemically-leavened pastes compared to puff pastry doughs. In making the products of my invention, I like to take the advantage of this fact and introduce relatively large quantities of flavoring into the chemically-leavened pastes. Then, in my cooked products, of the laminate while the chemically-leavened paste can act as the carrier for the flavoring.

I find it easy and practicable to use a chemically-leavened paste formulation wherein the weight percentage of flour ranges from 10 to 25 percent and the weight percentage of flavoring is at least 10. When potent flavors such as cinnamon, nutmeg, allspice, etc., are used, the weight percentage of flavoring used is less as required to realize the desired flavor characteristics. In such a formulation I maintain the total liquid content in chemically-leavened paste below 35 weight percent. The balance up to 100 weight percent comprises the shortening, non-fat dry milk, and the other ingredients usually used in the production of chemically-leavened or air-leavened pastes. Following preparation of the puff pastry dough and of the chemically-leavened paste, intermediate or uncooked products of the invention can be made as follows:

First, to puff pastry dough in sheet form is applied a layer of chemically-leavened, flavored paste, as upon the top or exposed face of the puff pastry sheet using any convenient procedure such as spatula application or the like. The pastry dough layer and the flavored paste layer are each in the thickness range of from about 1/16 to 3/8 of an inch. Commercially, the paste can be applied to the dough, for example, by pumping, as from an Alemite pump or the like, the chemically-leavened, flavored paste upon the sheeted dough moving on a conveyor belt. The paste may be applied in the form of a plurality of longitudinally extending, spaced, parallel ribbons or a single wide ribbon. Thereafter, a stationary spreader can be used to flatten the ribbons upon the puff pastry paste to produce a continuous layer or film of chemically-leavened paste over the top face of the puff pastry.

While no special precautions, procedure, or the like, need be observed in forming the laminations comprising the chemically-leavened, flavored paste and the puff pastry dough sheet, naturally the chemically-leavened, flavored paste should be uniformly spread upon the desired area of the puff pastry dough sheet so as to avoid any entrainment of air bubbles between the chemically-leavened paste layer and the puff pastry dough layer.

Often, the next step after formation of the laminate of chemically-leavened paste and puff pastry dough is to curl or roll the laminate, if the food product being manufactured is to be in a roll form.

Rolling, however, is not at all necessary to make products within my invention, since I have found it possible and practicable using my invention to make a number of delicious food products which are in a generally flat form and consist of alternating layers of chemically-leavened paste and puff pastry dough arranged in sandwich or stack fashion. One excellent type of flat product utilizes a bottom layer and a top layer which are formed of puff pastry dough and which have sandwiched therebetween as an intermediate or middle layer a layer of flavored chemically-leavened paste. To make such a product, one can sheet out a layer of puff pastry dough, and top with a layer of chemically-leavened, flavored paste, then one places another layer of sheeted puff pastry dough over the chemically-leavened, flavored paste forming a sandwich. Another way to accomplish the sandwich effect is to sheet the puff pastry dough as wide and thick as desired, spread a layer of chemically-leavened or air-leavened paste over one-half of the face of the dough sheet and fold the remaining half over it.

When a two-layer laminate of chemically-leavened, flavored paste and puff pastry dough sheet is curled or rolled into a string shape, the curling is conveniently accomplished using a convention curler such as produced by Moline, Anetsberger, Nafziger which extends longitudinally of the conveyor belt. The string is preferably rather tightly wound so as to achieve uniform contact between adjoining faces of layers therein.

The curled dough string and the flat sandwich-like structures are each further processed in any way desired or formed into any shape desired by suitable cutting and/or shaping operations.

The resulting intermediate or uncooked products are useful as articles of commerce. Thus, they can be stored, as by refrigeration or freezing for subsequent use. When subsequently packaged, these intermediate products are attractive consumer products in the frozen food field.

The intermediate products are cooked by any conventional procedure, usually baking, though by suitable selection of chemically-leavened, flavored paste and puff pastry dough sheet, laminated intermediate food products can be prepared within the teachings of this invention suitable for deep-fat frying as the final cooking step prior to eating. Since the puff pastry dough sheet and the chemically-leavened paste layer are each of generally conventional composition, and since the cooking of such materials is a matter of everyday familiarity to those of ordinary skill in the arts, no detailed description respecting cooking procedures is given herein.

The invention will be further illustrated by reference to the following examples:

A. AN EXEMPLARY TYPE OF PUFF PASTE DOUGH

*Puff pastry*

|  | Lbs. | Oz. |
|---|---|---|
| High protein spring wheat flour | 5 |  |
| Salt |  | 1½ |
| Puff pastry butter (or other shortening as desired) | 1 |  |
| Water (Variable to produce medium firm dough) | 3 |  |
| Cream of tartar (Special puff pastry) |  | ½ |
| Roll-in shortening | 4 |  |

Place all of the dough ingredients except the roll-in shortening into a mixer bowl. Then, using a dough hook, mix at 100 to 125 r.p.m. until a smooth dough results. Roll out on bench, spread with roll-in shortening, and then give three folds. Let rest in a cool place such as a dough retarder for 20 to 30 minutes. Roll out again and fold three times as for the spotting-in roll. Repeat this operation of rolling, folding, and resting four or five times. After the last rest, the paste is ready for lamination with a chemically-leavened or air-leavened paste.

B. EXEMPLARY TYPES OF CHEMICALLY-LEAVENED PASTES

1. *Coffee cake paste*

|  | Lbs. | Oz. |
|---|---|---|
| Granulated sugar | 6 |  |
| Shortening | 1 | 6 |
| Butter | 1 | 6 |
| Honey |  | 8 |
| Salt |  | 1 |
| Soda |  | ½ |
| Whole eggs | 2 | 14 |
| Liquid milk (Variable to produce medium firm dough) | 1 |  |
| Cake flour | 7 | 8 |
| Baking powder |  | ½ |
| Applesauce | 3 |  |

Blend together the sugar, shortening, butter, honey, salt, and soda until smooth. Add eggs slowly while creaming—cream light, add milk and applesauce alternately with the cake flour in two or three parts, mixing well after each addition until a smooth, drop cookie batter consistency is obtained. The paste is now ready for lamination with the puff paste dough.

2. Almond coffee cake paste

|  | Lbs. | Oz. |
| --- | --- | --- |
| Granulated sugar | 6 | |
| Shortening | 1 | 6 |
| Butter | 1 | 6 |
| Honey | | 8 |
| Almond or kernel paste | 3 | |
| Salt | | 1 |
| Soda | | ½ |
| Whole eggs | 2 | 14 |
| Liquid milk | 3 | |
| Cake flour | 7 | 8 |
| Baking powder | | ½ |
| Almond flavoring | | 1 |

Blend almond paste and honey to make a smooth paste. Blend together the sugar, shortening, butter, honey and almond paste mixture, salt, and soda until they are creamy. Add eggs in three or four portions, cream light, and add milk alternately with the cake flour, mixing well after each addition until a smooth, drop cookie batter consistency is obtained. The paste is now ready for lamination with the puff paste dough.

3. Cheese paste

|  | Lbs. | Oz. |
| --- | --- | --- |
| Sugar (Granulated, corn, brown, powdered, etc.) | 5 | |
| Shortening | 1 | 8 |
| Cream cheese | 1 | 8 |
| Dehydrated cheddar | | 8 |
| Salt | | 3 |
| Non-fat dry milk | | 8 |
| Whole eggs | 2 | 8 |
| Cake flour | 5 | 12 |
| Baking powder | | 2 |
| Water (Variable to obtain spreadable consistency) | 2 | |

Blend all of the dry materials, shortening, cheese and water until a smooth paste is formed. The eggs are added in three or four portions incorporating thoroughly after each addition. Paste is now ready for lamination with puff pastry.

LAMINATES OF THE INVENTION

Example 1

To form a laminate using puff pastry dough formulation A above and the chemically-leavened paste B1 above, one sheets such puff pastry dough to about 1/16 of an inch thick, and approximately 12 inches wide and as long as desired, and spreads thereover a layer of chemically-leavened paste of approximately the same thickness. Roll the laminated materials from top to center and from bottom to center (in the manner in which a scroll is rolled) forming two connected strings—cut the strings into slices approximately ¼ to ⅜ of an inch thick and each laminated slice is formed into the shape of a double snail. The resultant units can be either frozen for storage as an intermediate food product of the invention, or baked. Here, the double snails are baked in an oven for about 20 minutes at approximately 400° F. The baked products have continuously cellulated, self-supporting structures, no separation at interfaces between layers being observed therein. The results are summarized in Table I below.

Example 2

The puff pastry dough A and the chemically-leavened paste B2 above are laminated together by following the general procedure given in Example 1. This laminate is rolled into a single string form having a diameter of approximately two inches. The string is cut into slices approximately ¾ of an inch thick. Then with a French knife or other sharp cutting instrument, the slices are cut transversely along a diameter to within ½ of an inch of the opposite side edge. The slices are separated and formed into a palm leaf. The resultant units can be either frozen for storage as an intermediate food product of the invention, or baked. Here, the palm leaves are baked in an oven for about 20 minutes at approximately 400° F. The baked products have continuously cellulated, self-supporting structures, no separation at interfaces between layers being observed therein. The results are summarized in Table I below.

Example 3

Puff pastry dough A is sheeted into sheets 1/16 of an inch thick and 20 inches wide. Each such sheet is covered with a layer of approximately the same thickness of chemically-leavened paste B3 over two thirds of the face of the dough sheet parallel to its length. The bottom third is folded over the center third and the top third is folded over the center third. The resulting folded unit is cut into slices ½ of an inch to 3 inches wide, and each slice is given a single twist of 180°. The resultant units can be either frozen for storage as an intermediate food product of the invention, or baked. Here the twisted cheese straws are baked in an oven for about 20 minutes at approximately 400° F. The baked products have continuously cellulated, self-supporting structures, no separation at interfaces between layers being observed therein. The results are summarized in Table I below.

TABLE I

| | Intermediate laminate (uncooked) | | | | | Product laminate (cooked) | | |
| --- | --- | --- | --- | --- | --- | --- | --- | --- |
| | Puff paste dough | | Chemically-leavened dough | | | Cooking process | | |
| Ex. No. | Type | Layer thickness | Type | Layer thickness | Shape | Method | Temp. °F. | Time, min. |
| 1 | A | 1/16 | B1 | 1/16 | Double snail | Baking | Apprx. 400 | 18–20 |
| 2 | A | 1/16 | B2 | 1/16 | Palm leaf | do | Apprx. 400 | 18–20 |
| 3 | A | 1/16 | B3 | 1/16 | Twisted cheese straw | do | Apprx. 400 | 18–20 |

While I have shown and described specific and preferred embodiments above, I wish it to be specifically understood that the same are capable of modification without departure from the spirit and scope of the appended claims.

The claims are:

1. A cooked flour-based food product comprising a continuously cellulated self-supporting structure characterized by:
   (a) a puff pastry dough sheet bonded on at least one surface to a chemically-leavened, flavored paste layer,
   (b) said puff pastry dough sheet having a total flour content in the range of from about 40 to 60 percent, based on total weight of puff pastry dough, and
   (c) said chemically-leavened, flavored paste layer having a total flour content in the range of from about 10 to 25 weight percent, based on total weight of chemically-leavened paste and by having a total flavoring content of at least about 10 weight percent.

2. The product of claim 1 wherein said chemically-leavened paste layer is further characterized by having a water content not greater than about 35 weight percent based on total weight of chemically-leavened dough.

3. The product of claim 1 wherein said chemically-leavened, flavored paste layer contains a total flavoring content less than about 10 weight percent and such flavoring is a potent flavor.

4. A cooked flour-based laminated food product comprising a continuously cellulated, self-supporting structure, said structure being characterized by having at least one layer of a chemically-leavened flavor paste bonded on at least one surface to a layer of a puff pastry dough.

References Cited by the Examiner

UNITED STATES PATENTS

| | | | |
|---|---|---|---|
| 1,975,326 | 10/1934 | Loose et al. | 107—54.2 |
| 2,172,211 | 9/1939 | Lloyd | 99—92 |
| 2,547,206 | 3/1951 | Hanau | 99—92 |
| 2,598,282 | 5/1952 | Melnick | 99—139 |
| 2,627,825 | 2/1953 | Stiles | 107—54 |
| 2,919,986 | 1/1960 | Johnson | 99—94 |
| 3,142,573 | 7/1964 | Erekson et al. | 99—92 |

OTHER REFERENCES

"Betty Crocker's Picture Cook Book," 1st Edition, 1950, McGraw-Hill Book Company, Inc., New York, page 315.

Daniel, A. R.: "Bakery Materials and Methods," London, Marclaren and Sons, Ltd., 1963, 4th edition, pp. 398–399.

A. LOUIS MONACELL, *Primary Examiner.*

RAYMOND N. JONES, *Examiner.*